No. 743,894. Patented November 10, 1903.

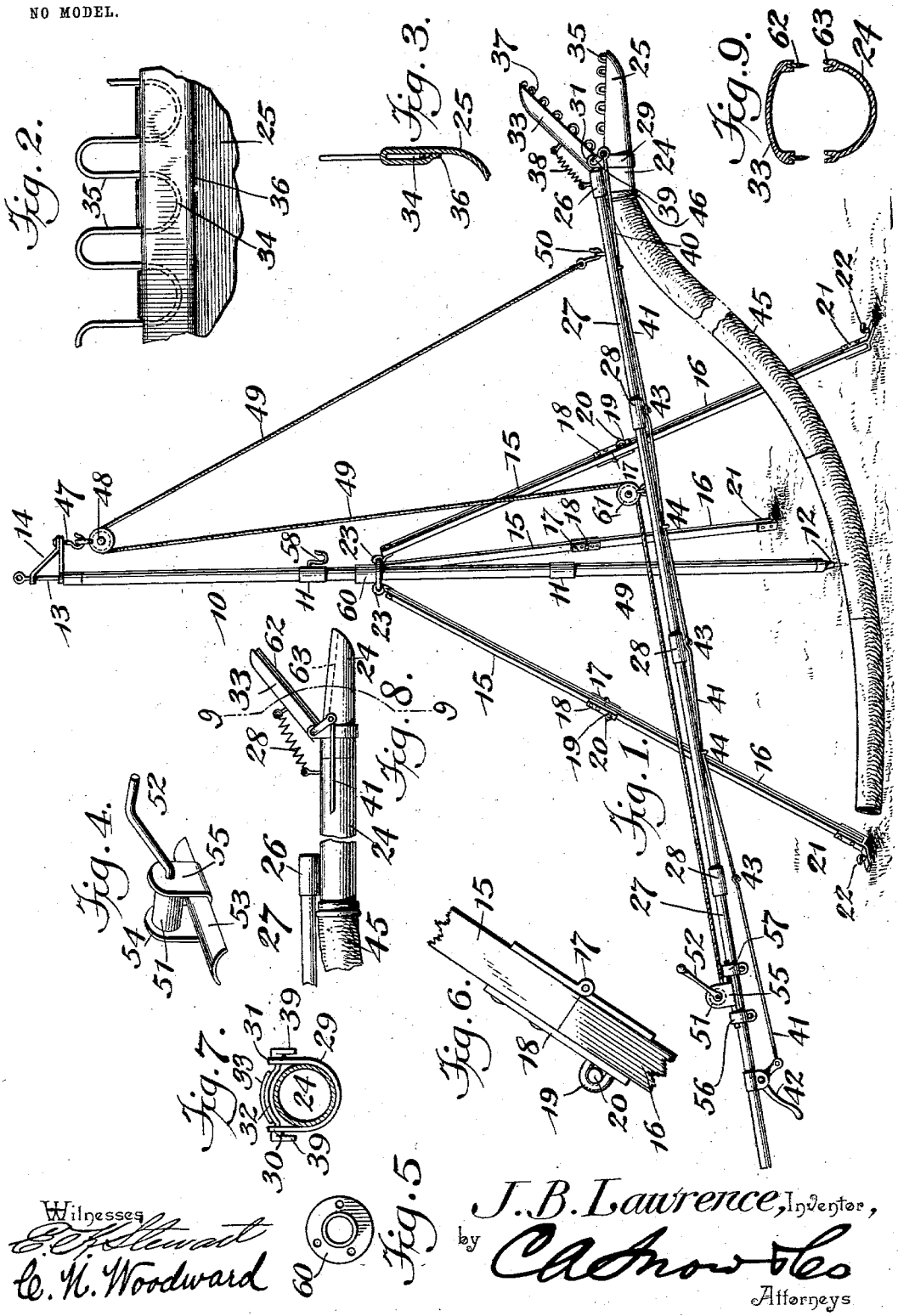

UNITED STATES PATENT OFFICE.

JAMES B. LAWRENCE, OF BARBOURSVILLE, WEST VIRGINIA.

FRUIT-PICKER.

SPECIFICATION forming part of Letters Patent No. 743,894, dated November 10, 1903.

Application filed May 6, 1903. Serial No. 155,909. (No model.)

*To all whom it may concern:*

Be it known that I, JAMES B. LAWRENCE, a citizen of the United States, residing at Barboursville, in the county of Cabell and State of West Virginia, have invented a new and useful Fruit-Picker, of which the following is a specification.

This invention relates to devices employed for gathering fruit from trees, and has for its object to simplify and improve devices of this character and to produce a device which may be adapted to the largest or smallest trees with equal facility; and the invention consists in certain novel features and combinations of parts, as hereinafter shown and described, and specified in the claims.

In the drawings illustrative of the invention, in which corresponding parts are denoted by like designating characters, Figure 1 is a perspective view of the device complete. Figs. 2 and 3 are enlarged details of portions of jaws of the picker portion of the apparatus. Fig. 4 is an enlarged detached perspective view of the winding-reel. Fig. 5 is a plan view, enlarged, of the mast-support ferrule. Fig. 6 is an enlarged detail of one of the joints of the brace members. Fig. 7 is a transverse section of the gathering-cylinder, enlarged. Fig. 8 is a view illustrating a slightly-modified form of the gathering-jaws. Fig. 9 is an enlarged transverse section on the line 9 9 of Fig. 8.

The improved device consists of a mast or standard 10, formed of a plurality of sections detachably coupled by sleeves or ferrules 11, so that the mast may be disconnected for storage or transportation purposes or when its length is to be reduced or increased, as it is obvious that a mast of any desired length may be thus constructed. Generally three sections, as shown, will be sufficient, of about eight or nine feet each, to form a mast of twenty-four or twenty-seven feet, as fruit-trees rarely exceed that height; but I do not wish to be limited to any specific number or length of the sections. The lower end of the lower section of the mast will be provided with a spur or point 12 to enter the ground and prevent slipping, and the upper end of the upper section will be provided with a pin 13, upon which a bracket 14 is rotatively supported, the function of which will be hereinafter explained. The mast is supported in a vertical position by spaced diagonal brace members, any desired number being employed, but generally three will be sufficient, as shown. These brace members will be constructed in folding sections, so that they may be folded together with the mast, and each formed, preferably, of two wooden rods 15 16, hinged together, as at 17, on one side and with a slotted hasp 18 extending from one section and engaging a staple 19 on the other section, the staple adapted to receive a holding pin or hook 20, as shown. By this simple means the brace-sections may be firmly united or folded together as required.

The lower end of each of the lower sections 16 of the brace members is provided with a projecting foot 21, having an aperture to receive a holding-peg 22, the pegs having enlarged heads to prevent them from passing entirely through the apertures. By this arrangement it will be obvious that the brace members may be "staked" at any desired points relative to the mast.

The foot members 21 are preferably formed with forked upper ends embracing opposite sides of the brace-sections and secured thereto as by bolts or rivets, as shown.

Surrounding one of the mast-sections, preferably the central one, is a sleeve 60, having spaced apertures adapted to be engaged by eyes 23, extending from the brace-sections 15, as shown, by which means the brace members are united by hinge-like joints to the sleeve. By this simple means it is obvious the mast may be supported from all sides and maintained in a vertical position, while at the same time the mast is movable vertically in the sleeve, so that the relative positions of the stake 22 and spur 12 may be changed to any desired extent to adapt the device to the condition of the ground regardless of the fact as to whether it is inclined or level, so that the mast may be supported in a vertical position upon all kinds and conditions of the ground. To this end the sleeve 60 will be somewhat larger than the part of the mast which it engages to permit the necessary lateral movement of the latter when being adjusted to uneven ground, as above noted.

The mast portion is designed to support the fruit-picking portion of the device and will be erected relatively near the tree or contiguous to two or more of the trees from which the fruit is to be gathered.

The gathering portion consists of a receiver formed with the rear cylindrical portion 24 and front semicylindrical portion 25, the cylindrical portion provided with a socket 26 to receive the handle member 27, as shown. The handle member is formed of a plurality of separable sections united by ferrules 28, similar to a jointed fishpole, and may be of any desired length or of variable length, as may be desired. It is obvious that the handle member may thus be formed in as many sections and of any length desired, the separable sections enabling it to be folded into smaller space for transportation or storage.

The receiver 24 is provided with a strap 29, embracing its lower side at the juncture of the portions 24 25 and with its ends extended and perforated, as at 30 31, to form ears to receive the ends of a curved axle 32, the axle supporting a fruit-severing lid or closure 33, extending over the protruding semicylindrical portion 25 of the receiver.

The inclined edges of the semicylindrical portion 25 are folded over and provided with spaced perforations at the folds, through which the loops 34 of a wire bent to form spaced teeth 35 protrude and in which the bent wire is secured by compressing the folded sheet metal between the loops and soldering or otherwise securing it in place, as indicated at 36 in Figs. 2 and 3. By this means a plurality of spaced teeth or fingers are provided along the upper edges of the semicylindrical sections, as shown. The adjacent edges of the plate 33 are likewise folded over and perforated and adapted to receive the looped portions of a plurality of spaced teeth 37, formed from a single piece of wire in the same manner as the teeth 35 are formed on the portion 25 and disposed to alternate therewith, so that when the closure portion is operated the two sets of teeth will interengage, as indicated.

A spring 38 will be connected between the free outer end of the member 33 and the rear of the portion 24 of the receiver and exerting its force to maintain the member 33 yieldably in its open position, as shown.

The ends of the axle member 32 are provided with small crank-arms 39, from one of which a draft-wire 41 leads to the opposite end of the handle member 27 and terminates in a lever-arm 42, pivoted to the handle member. By this simple means it will be obvious that the operation of the lever-arm 42 will cause the closure member 33 to be correspondingly operated, and when the lever-arm is released the spring 38 will restore the closure to its normal open position. The draft-wire 41 will be jointed, as at 43, to correspond to the ferrules 28, so that it will fold with the handle member when the device is dismembered for transportation or storage and will be supported at suitable intervals relative to the handle member by guide staples or eyes 44.

Leading rearwardly from the cylindrical section 24 of the receiver is a fabric chute or conductor 45 of any required length to serve as a guide for the severed fruit and prevent abrasion or other damage thereto. The conductor 45 will be cylindrical in cross-section and attached to the portion 24, as by a binding-wire 46, and may be in sections united by hooks and eyes or by lacing-cords passing through eyelets in the adjacent sections; but as the construction of these fastening means is so well understood they are not further illustrated. The conductor may terminate in any suitable receptacle, as will be obvious. By this simple arrangement the fruit may be plucked by inserting the protruding portion 25 beneath it and operating the lever-arm 42, which will depress the member 33 and sever the fruit-stem between the teeth and permit it to run down the conductor 45 without damage.

Suspended from the bracket 14 is a swivel-hook 47, and from this hook a pulley-block 48 is supported and carrying a draft cable or cord 49. One end of the cord is connected at 50 to the handle member and passing thence through the pulley-block 48 and thence through another pulley-block 61 upon the handle member and thence to a winding-reel 51 at the rear of the latter. The reel will be provided with an operating-crank 52, as shown. By this simple arrangement it will be obvious that the receptacle and plucking end of the handle member 27 may be elevated to any desired degree to bring the receiver into operative position relative to any specimen of the fruit at any part of the tree within the range or sweep of the handle member and its flexible supporting-cord. It will also be obvious that the flexible cords will permit the handle member with its receiver attached to swing laterally to any required extent and moved in all required directions to reach all the fruit no matter how remote or inaccessible by ordinary means.

The construction of the reel-support is shown more clearly in Fig. 4; and it consists of a base portion 53, having upturned sides 54 55, spaced apart and forming supports for the axle of the reel, and with the extended ends clamped to the handle member by clips 56 57, as shown. By this simple means the reel is supported at a point convenient to the operator, who guides the handle member with one hand and operates the reel-crank with the other. By this simple arrangement all the various movements of the device are under the complete control of the operator.

The parts will be constructed of suitable material as light as will be convenient with durability and strength and may be of any size or in any proportions which the sizes of the trees will require. The uppermost of the ferrules 11 will be provided with a hook 58, upon which the pulley-block 48 may be supported when two sections only of the mast portion are required, which may be desirable when using the device for the shorter trees.

When fruit is to be gathered on which it is desired to retain a portion of the stem, the modified form shown in Figs. 8 and 9 will be employed, consisting of a blade 62, arranged in the movable-jaw member 33, and a corresponding recess 63 in the lower-jaw member 25, which will thus replace the interengaging fingers 35 and 37. By this simple means the stems may be severed at any desired distance from the fruit, which is very desirable when the fruit is to be preserved.

This cylindrical portion 24 may be extended, as in Fig. 8, if desired, to protect the relatively fragile conductor 45 from thorns or abrasions from the limbs of the trees, as the cylinders will be metal, and by extending them as shown the fruit may be reached without bringing the fabric conductor into contact with the thorns or limbs.

Having thus described my invention, what I claim is—

1. In a fruit-gatherer, a supporting-frame having a substantially vertical mast, a bracket mounted for rotation upon said mast, a fruit-gatherer having a supporting-handle, a cord-pulley movably suspended from said bracket, and a cord connected by one end to said picker-handle and leading over said pulley and operatively connected at the other end to said picker-handle, whereby the picker may be adjusted relative to said mast, substantially as described.

2. In a fruit-gatherer, a supporting-frame having a substantially vertical mast, a bracket mounted for rotation upon said mast, a fruit-gatherer having a supporting-handle, a winding-drum carried at the operative end of said handle member, a cord-pulley movably suspended from said bracket, a cord connected at one end to said handle member and leading over said cord-pulley and connected at the other end to said winding-drum, whereby the picker may be adjusted relative to said mast, substantially as described.

3. In a fruit-gatherer, a picker member consisting of a receiver formed with cylindrical rear portion and semicylindrical forward portion and connected to a supporting-handle member, a cover member movably connected to said receiver and adapted to close over said semicylindrical portion, the edges of said semicylindrical portion folded over and provided with spaced apertures in said folded portion, spaced teeth formed of wire bent into spaced loops inserted through said perforations, and means for securing said folded portions to the body of the receiver, substantially as described.

4. In a fruit-gatherer, a supporting-frame having a substantially vertical mast, a bracket mounted for rotation upon said mast, a fruit-gatherer having a supporting-handle, a cord-pulley movably suspended from said bracket, a cord-pulley connected intermediately of said handle member, a cord connected to said handle member relatively near said gatherer and leading over said pulleys, and operatively connected to said handle member relatively near its opposite end, substantially as described.

In testimony that I claim the foregoing as my own I have hereto affixed my signature in the presence of two witnesses.

JAMES B. LAWRENCE.

Witnesses:
W. M. HOVEY,
GARFIELD STOWASSER.